July 2, 1968
T. IKEDA
3,391,323
HIGH EFFICIENCY SYNTHETIC WAVE INVERTER
Filed March 31, 1965
4 Sheets-Sheet 1
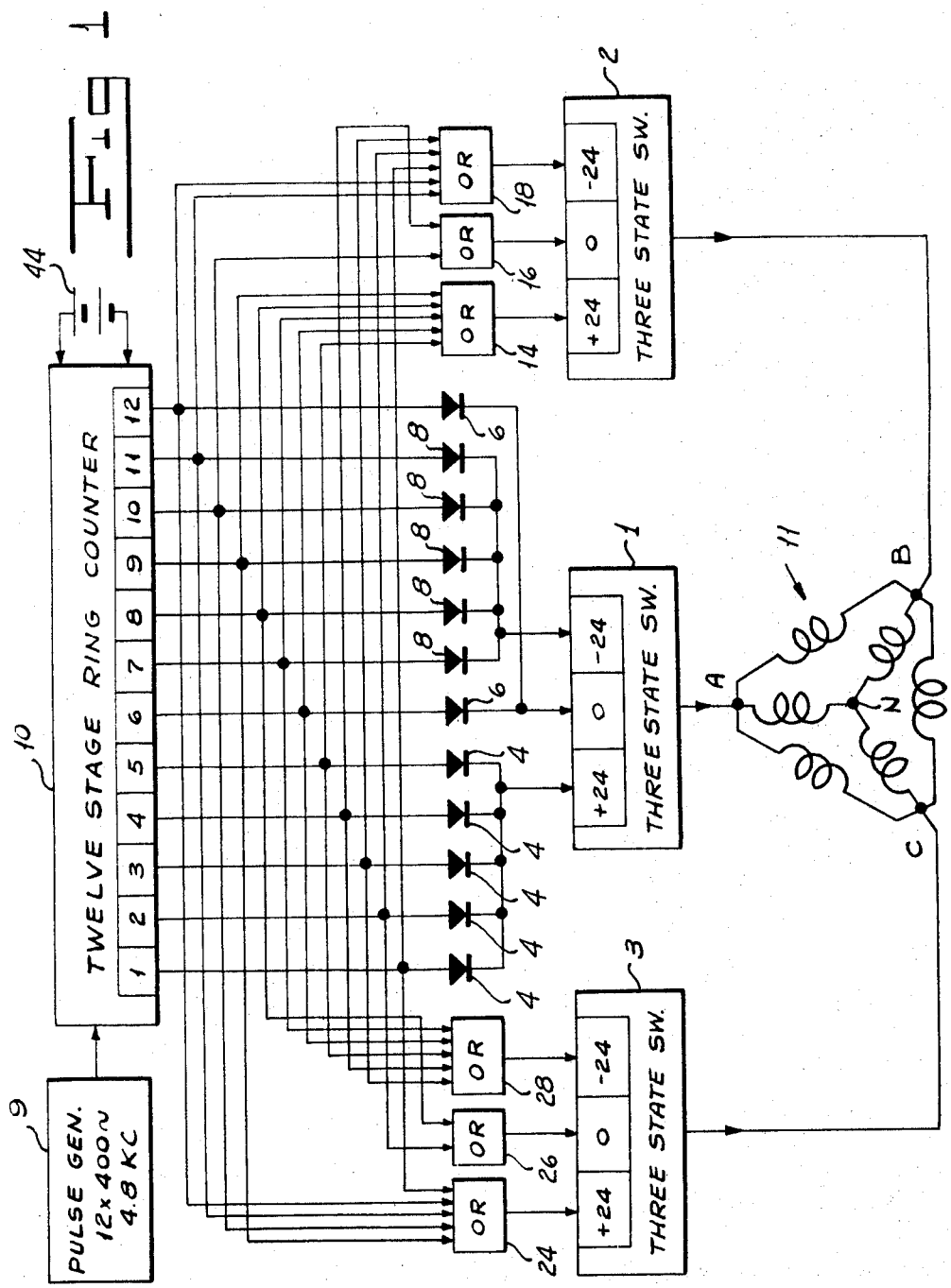
INVENTOR.
THOMAS IKEDA
BY
Shenier & O'Connor
ATTORNEYS

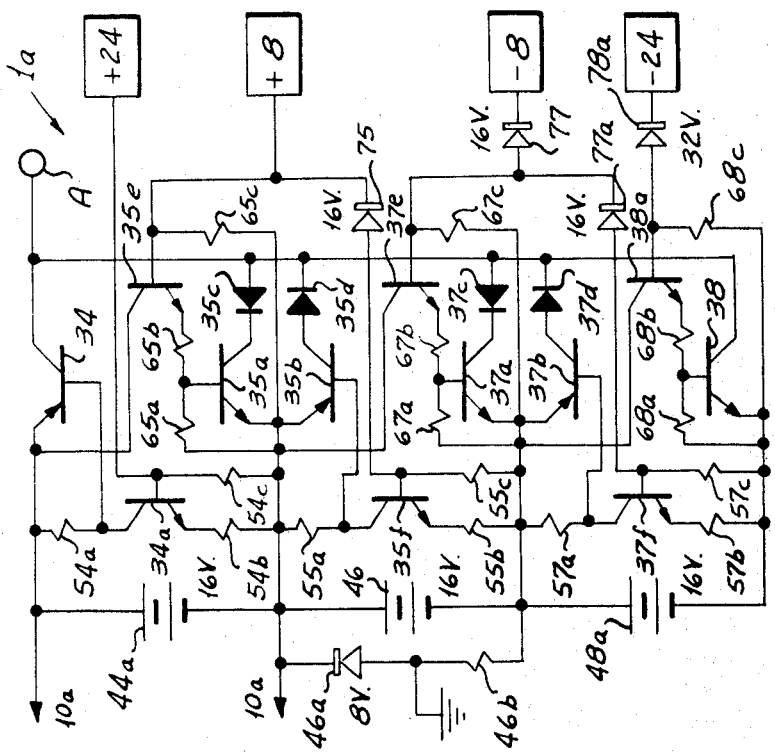
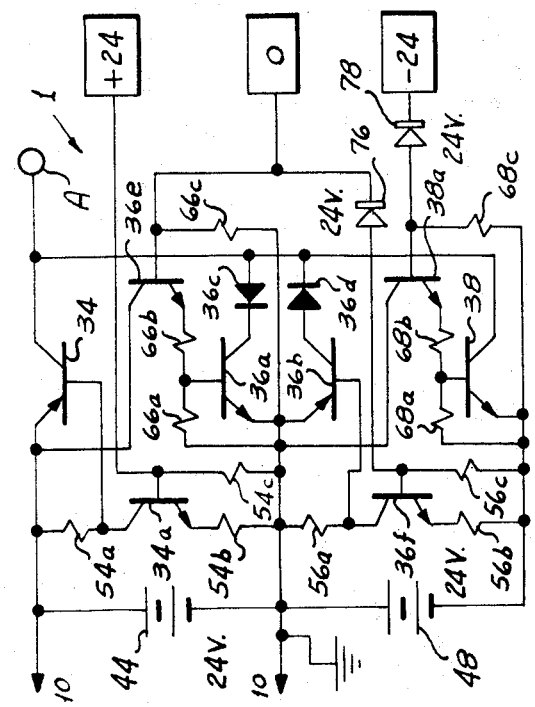

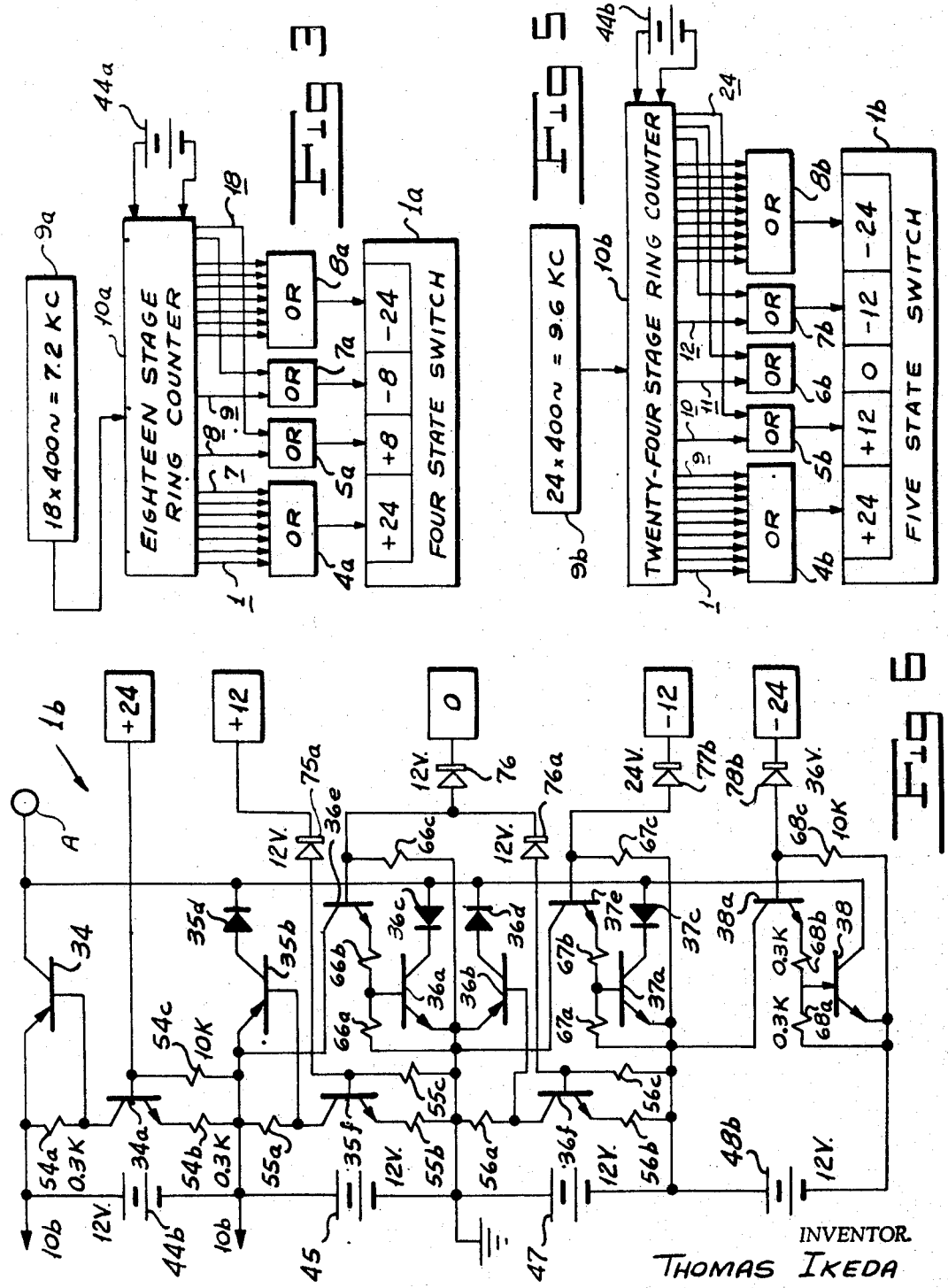

July 2, 1968
T. IKEDA
3,391,323
HIGH EFFICIENCY SYNTHETIC WAVE INVERTER
Filed March 31, 1965
4 Sheets-Sheet 4
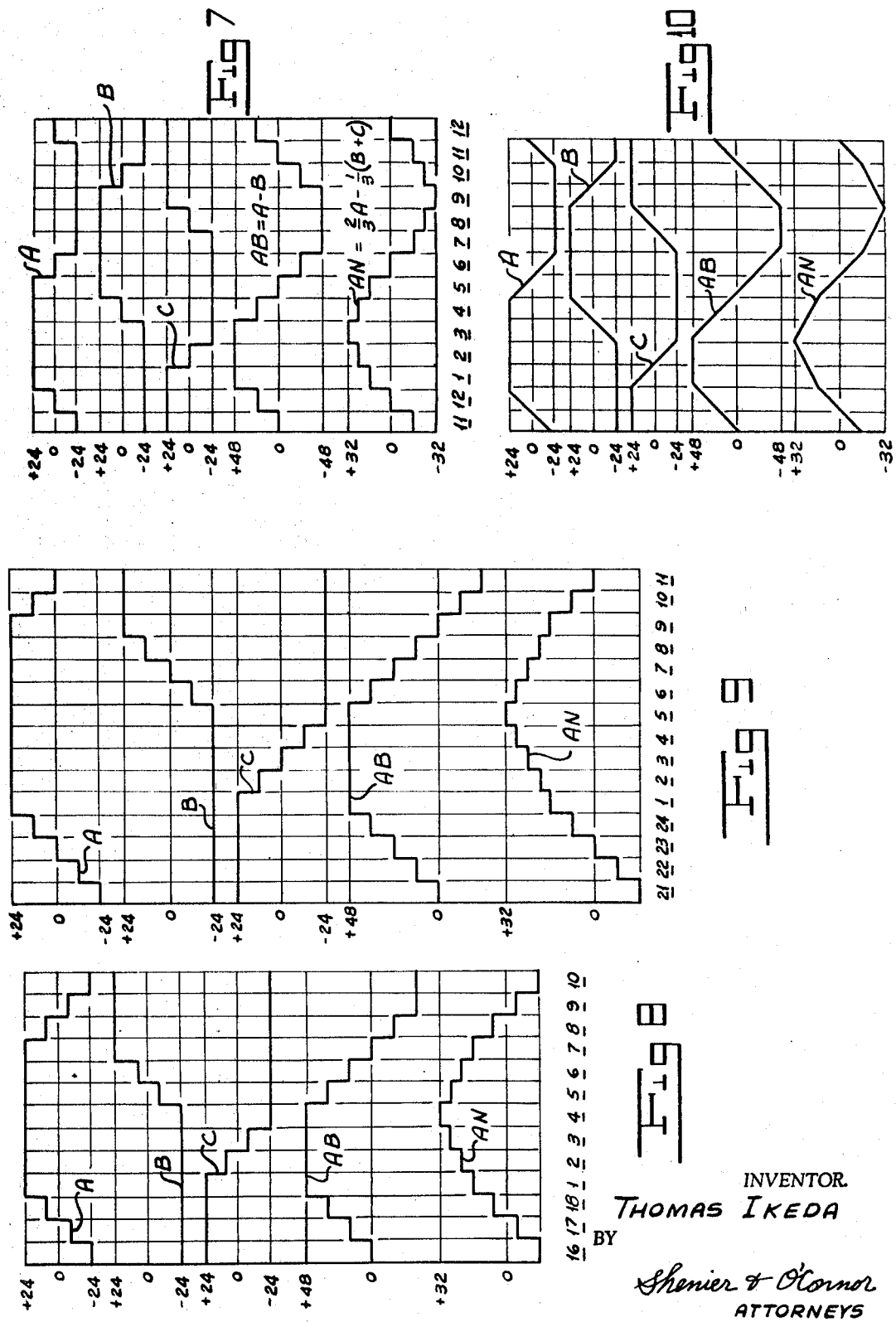
INVENTOR.
THOMAS IKEDA
BY
Shenier & O'Connor
ATTORNEYS

United States Patent Office 3,391,323
Patented July 2, 1968

3,391,323
HIGH EFFICIENCY SYNTHETIC
WAVE INVERTER
Thomas Ikeda, Westport, Conn., assignor to United Aircraft Corporation, East Hartford, Conn., a corporation of Delaware
Filed Mar. 31, 1965, Ser. No. 444,204
12 Claims. (Cl. 321—5)

ABSTRACT OF THE DISCLOSURE

The invention contemplates the provision of a switch having three or more states. For example, a three-state switch may provide the outputs +1, 0, and −1; a four-state switch may provide the outputs +3, +1, −1, and −3; and a five-state switch may provide the outputs +2, +1, 0, −1, and −2. By proper selection not only of the particular voltage levels but also of the time of switching between levels a low harmonic content stepwise approximation to a single phase sinusoid may be achieved. In balanced polyphase circuits, a reduction in harmonic content is inherently achieved by virtue of the combination of phase-displaced voltages which results, not because of summing transformers, but instead because of the balanced nature of the load itself. For balanced polyphase circuits the voltage steps are preferably equal and occur at equally spaced time intervals so that in the limiting case of an infinite number of voltage steps, a resultant trapezoid waveform is produced.

---

My invention relates to high efficiency inverters and more particularly to polyphase inverters employing switches having at least three states.

In the prior art inverters employing two-state switches have been employed. These two-state switches provide either positive or negative polarity signals and generate symmetrical square waves. The harmonic content of these square waves is high; and the direct application to a load would result in large harmonic power dissipation. In order to reduce the harmonic content, some circuits of the prior art employ a plurality of phase-displaced two-state switches and combine their outputs by means of transformers to produce a resultant waveform comprising a stepwise approximation to a sinusoid.

However, the apparent increase in efficiency due to decrease in harmonic content is seriously offset by the added loss introduced by the transformers which effect the combination of voltages. For electronic inverters, which are of relatively low power output, the additional loss in transformers may exceed the decrease in loss due to the improved waveform. In other inverters of the prior art, filter circuits utilizing inductors and capacitors have been employed. Again these filter inductors introduce loss which impairs the efficiency. The voltage-combining transformers and the filter inductors and capacitors are relatively heavy and bulky.

One object of my invention is to provide a high efficiency inverter which employs no transformers or filter inductors or capacitors.

Another object of my invention is to provide a high efficiency inverter which is direct-coupled.

Still another object of my invention is to provide a high efficiency inverter providing an alternating current of low harmonic content.

A further object of my invention is to provide a high efficiency inverter employing switches having three or more states.

Other and further objects of my invention will appear from the following description.

Description of the drawings

In the accompanying drawings which form part of the instant specification and which are to be read in conjunction therewith and in which like reference numerals are used to indicate like parts in the various views, FIGURE 1 is a schematic view of a three-phase inverter employing three-state switches.

FIGURE 2 shows the details of one of the switches used in the inverter of FIGURE 1.

FIGURE 3 is a fragmentary schematic view showing a three-phase inverter employing four-state switches.

FIGURE 4 shows the details of one of the switches of FIGURE 3.

FIGURE 5 is a fragmentary schematic view of a three-phase inverter employing five-state switches.

FIGURE 6 shows the details of one of the switches of FIGURE 5.

FIGURE 7 shows various voltages for the inverter of FIGURE 1.

FIGURE 8 shows these voltages for the inverter of FIGURE 3.

FIGURE 9 shows these voltages for the inverter of FIGURE 5.

FIGURE 10 shows these voltages for a balanced three-phase inverter employing switches having an infinite number of states.

More particularly referring now to FIGURE 1 of the drawings, three-state switches 1, 2, and 3 each selectively provide +24 volts, 0 volts and −24 volts. The outputs of these switches are the phases A, B, and C which are applied to a balanced three-phase load 11 which may be connected either in Y or in delta or in both Y and delta as shown. The Y connected load has a load neutral N. Assuming that it is desired to produce a 400 cycle output, a generator 9 provides pulses at a frequency of 4.8 kilocycles. The output of pulse generator 9 is coupled to a twelve-stage ring counter 10. The 1, 2, 3, 4, and 5 outputs of ring counter 10 are coupled forwardly through respective OR circuit crystals 4 to the +24 input of switch 1. The 7, 8, 9, 10, and 11 outputs of counter 10 are coupled forwardly through respective OR circuit crystal 8 to the −24 input of switch 1. The 6 and 12 outputs of counter 10 are coupled through respective OR circuit crystal 6 to the 0 input of switch 1. The 5, 6, 7, 8, and 9 outputs of counter 10 are coupled to an OR circuit 14, the output of which is impressed upon the +24 input of switch 2. The 11, 12, 1, 2, and 3 outputs of counter 10 are coupled to an OR circuit 18, the output of which is impressed upon the −24 input of switch 2. The 10 and 4 outputs of counter 10 are coupled to an OR circuit 16, the output of which is impressed on the 0 input of switch 2. The 9, 10, 11, 12, and 1 outputs of counter 10 are coupled to an OR circuit 24, the output of which is impressed upon the +24 input of switch 3. The 3, 4, 5, 6, and 7 outputs of counter 10 are coupled to an OR circuit 28, the output of which is impressed upon the −24 input of switch 3. The 2 and 8 outputs of counter 10 are coupled to an OR circuit 26, the output of which is impressed upon the 0 input of switch 3.

Referring now to FIGURE 2, each of the three-state switches of FIGURE 1 is supplied by a first 24 volt battery 44 and a second 24 volt battery 48. The negative terminal of battery 44 and the positive terminal of battery 48 are grounded. The positive terminal of battery 44 is connected to the emitter of a p-n-p output transistor 34, the collector of which is connected to the output terminal A of switch 1. The negative terminal of battery 48 is connected to the emitter of an n-p-n- output transistor 38, the collector of which is connected to terminal A. The emitters of an n-p-n power output transistor 36a and of a p-n-p power output transistor 36b are grounded. The collector of transistor 36a is connected backwardly through a rectifier 36c to terminal A; and the collector of transistor 36b is connected forwardly through a rectifier 36d to terminal A. The +24 input of switch 1 is connected to the base of an n-p-n- driver transistor 34a and to ground through a resistor 54c. The emitter of transistor 34a is connected to ground through a resistor 54b. The collector of transistor 34a is connected to the base of transistor 34 and through a resistor 54a to the positive terminal of battery 44. The 0 input of switch 1 is connected to the base of an n-p-n driver transistor 36e and to ground through a resistor 66c. The positive terminal of battery 44 is connected to the collector of transistor 36e. The emitter of transistor 36e is connected through a resistor 66b to the base of transistor 36a which is grounded through a resistor 66a. The 0 input of switch 1 is also connected backwardly through a 24 volt Zener diode 76 to the base of an n-p-n driver transistor 36f. The base and the emitter of transistor 36f are connected to the negative terminal of battery 48 through respective resistors 56c and 56b. The collector of transistor 36f is connected to the base of transistor 36b and is grounded through resistor 56a. The −24 input of switch 1 is connected backwardly through a 24 volt Zener diode 78 to the base of an n-p-n driver transistor 38a, the collector of which is grounded. The emitter of transistor 38a is connected through a resistor 68b to the base of transistor 38. The bases of transistors 38 and 38a are connected to the negative terminal of battery 48 through respective resistors 68a and 68c.

As can be seen in FIGURE 1 and as indicated in FIGURE 2, the positive and negative terminals of battery 44 are connected to ring counter 10. For ring counter 10 all but one of the ouputs are at ground potential; and that one is at a potential of +24 volts. If a +24 volt signal is applied to the +24 input of switch 1, driver transistor 34a is rendered conductive which in turn renders output transistor 34 conductive, causing the +24 volt potential of the positive terminal of battery 44 to appear at terminal A. If a +24 volt signal is applied to the 0 input of switch 1 driver transistor 36e is rendered conductive; and driver transistor 36f is rendered conductive through Zener diode 76. This causes output transistors 36a and 36b to be rendered conductive; and terminal A is at ground potential. If a +24 volt signal is applied to the −24 input of switch 1, then this signal is coupled through Zener diode 78 rendering driver transistor 38a and hence output transistor 38 conductive; and terminal A is maintained at the −24 volt potential of the negative terminal of battery 48.

Referring now to FIGURE 7, there is shown the phase A output of switch 1, the phase B output of switch 2, and the phase C output of switch 3. The line-to-line voltage between the outputs of switches 1 and 2 is indicated as AB and is equal to $A-B$. AB is 48 volts for a 1, 2, or 3 output from counter 10; AB is 24 volts for a 12 or 4 output from counter 10; AB is 0 volts for a 5 or 11 output from counter 10; AB is −24 volts for a 6 or 10 output from counter 10; and AB is −48 volts for a 7, 8, or 9 output from counter 10. The line-to-load neutral voltage between the phase A output of switch 1 and the neutral N of the balanced Y-connected load is indicated as AN and is equal to $(2A-B-C)/3$. AN is +32 volts for a 3 output from counter 10: +24 volts for a 2 or 4 output from counter 10; +16 volts for a 1 or 5 output from counter 10; 0 volts for a 6 or 12 output from counter 10; −16 volts for a 7 or 11 output from counter 10; −24 volts for an 8 or 10 output from counter 10; and AN is −32 volts for a 9 output from counter 10.

For an unbalanced load it will be noted that with a 6 or 12 output from counter 10, current may flow into phase A at 0 volts. Thus in FIGURE 2 the current path would be through rectifier 36c and transistor 36a. On the other hand current may flow out of phase A at 0 volts. In FIGURE 2 the current path would now be through transistor 36b and rectifier 36d. It will be appreciated that it is not sufficient merely to open circuit switch 1 during the 6 and 12 outputs from counter 10; rather, switch 1 must instead provide a low impedance path to ground. Moreover, the low impedance path to ground provided by switch 1 during the 6 and 12 outputs of counter 10 must be capable of passing current in both directions. This is the reason for providing the two complementary transistors 36a and 36b which are both rendered conductive with a 0 output applied to switch 1. Rectifiers 36c and 36d are provided in order to prevent transistors 36a and 36b from short-circuiting the output at terminal A where either a +24 volt or a −24 volt output is desired. For example, assume rectifier 36d were eliminated. When transistor 34 conducts and terminal A is at a potential of +24 volts, this potential would be applied to the collector of transistor 36b. Inverted transistor action would then occur with the collector of transistor 36b acting as an emitter and the emitter acting as a collector. A large base current would flow through resistor 56a; and a large shunting current would flow through transistor 36b. Similarly, rectifier 36c prevents inverted transistor action in output transistor 36a by virtue of the large base current which would flow through resistor 66a when the terminal A output of switch 1 is −24 volts.

Currents will also flow in phase A at 0 volts where a balanced load is reactive. If the power factor of the load is sufficiently low as to produce a phase shift in current flow of more than 15°, then current will flow into phase A at +24 volts. Transistors 34 and 38 permit this bilateral current flow. For example if current flows into phase A with transistor 34 conductive, then its collector acts as an emitter and its emitter acts as a collector. The base current of transistor 34 is augmented by this inverted transistor action because of the presence of resistor 54a. If current flows out of phase A with transistor 38 conductive, then inverted transistor action occures with augmented base current because of resistor 68a. Thus transistors 34 and 38 are each capable of passing load current in both directions.

Referring now to FIGURE 3, for a 400 cycle output, generator 9a provides pulses at a frequency of 7.2 kc. which are coupled to an eighteen-stage ring counter 10a. The 1 through 7 outputs of counter 10a are coupled to an OR circuit 4a the output of which is impressed upon a +24 input of a four-state switch 1a. The 8 and 18 outputs of counter 10a are coupled to an OR circuit 5a, the output of which is impressed upon a +8 input of switch 1a. The 9 and 17 outputs of counter 10a are coupled to an OR circuit 7a, the output of which is impressed upon a −8 input of switch 1a. The 10 through 16 outputs of counter 10a are coupled to an OR circuit 8a, the output of which is impressed upon a −24 input of switch 1a.

The outputs of ring counter 10a actuate additional phase-displaced four-state switches 2a and 3a (not shown) in a manner similar to that shown in FIGURE 1. In FIGURE 1 the phase displacement is four counts; and in FIGURE 3 the phase displacement would be six counts.

Referring now to FIGURE 4, three 16 volt batteries supply common power for each of the four-state switches. The negative terminal of battery 44a is connected to the positive terminal of battery 46. The negative terminal of battery 46 is connected to the positive terminal of battery 48a. The positive terminal of battery 46 is connected to the cathode of an 8 volt Zener diode 46a. The anode of Zener diode 46a is grounded and is connected through a resistor 46b to the negative terminal of battery 46. The circuit comprising Zener diode 46a and resistor 46b is not required in practice and has been shown merely to provide a ground reference for ease of description.

As indicated in FIGURE 4 and as shown in FIGURE 3, battery 44a drives ring counter 10a. For ring counter 10a all but one of its outputs is at a potential of +8 volts and that one of the outputs is at a potential of +24 volts. The +8 input of switch 1a is connected to the base of a driver transistor 35e, the collector of which is connected to the positive terminal of battery 44a. The emitter of transistor 35e is connected through a resistor 65b to the base of an n-p-n output transistor 35a The +8 input of switch 1 is also connected backwardly through a 16 volt Zener diode 75 to the base of an n-p-n driver transistor 35f. The emitter and the base of transistor 35f are coupled through respective resistors 55b and 55c to the negative terminal of battery 46. The collector of transistor 35f is connected to the base of a p-n-p output transistor 35b, and through a resistor 55a to the positive terminal of battery 46. The emitters of transistors 35a and 35b are connected to the positive terminal of battery 46. The bases of transistors 35a and 35e are connected through respective resistors 65a and 65c to the positive terminal of battery 46. The collector of transistor 35a is connected backwardly through a rectifier 35c to output terminal A; and the collector of transistor 35b is connected forwardly through a rectifier 35d to output terminal A. The −8 input of switch 1a is connected to the cathode of a 16 volt Zener diode 77. The anode of Zener diode 77 is connected to the base of a driver transistor 37e and is connected backwardly through a 16 volt Zener diode 77a to the base of a driver transistor 37f. The emitter and the base of transistor 37f are connected through respective resistors 57b and 57c to the negative terminal of battery 48a. The collector of transistor 37f is connected to the base of a p-n-p output transistor 37b and is coupled through a resistor 57a to the positive terminal of battery 48a. The collector of transistor 37e is connected to the positive terminal of battery 46; and its emitter is coupled through a resistor 67b to the base of an n-p-n output transistor 37a. The emitters of transistors 37a and 37b are connected to the positive terminal of battery 48a. The bases of transistors 37a and 37e are connected through respective resistors 67a and 67c to the positive terminal of battery 48a. The collector of transistor 37a is connected backwardly through a rectifier 37c to output terminal A; and the collector of transistor 37b is connected forwardly through a rectifier 37d to output terminal A. The driver circuit comprising transistor 34a shunts battery 44a; the driver circuit comprising transistor 38a shunts battery 48a; and the −24 input of switch 1a is coupled backwardly through a 32 volt Zener diode 78a to the base of the driver transistor 38a.

In operation of the circuit of FIGURE 4, with a +8 input, driver transistors 35e and 35f are rendered conductive which in turn renders output transistors 35a and 35b conductive, causing the +8 volt potential of the positive terminal of battery 46 to be impressed upon output terminal A. Similarly, with a −8 input to switch 1a, driver transistors 37e and 37f are rendered conductive thereby causing output transistors 37a and 37b to be rendered conductive, causing the −8 volt potential at the negative terminal of battery 46 to be impressed upon terminal A.

In operation of the circuit of FIGURE 3 and referring now to FIGURE 8, the line-to-line voltage AB is +48 volts for a 1, 2, 3, or 4 output from ring counter 10a; is +32 volts for a 5 or 18 output; is +16 volts for a 6 or 17 output; and AB is 0 volts for a 7 or 16 output from ring counter 10a. The line-to-load neutral voltage AN is +32 volts for a 4 output from ring counter 10a; is +26.667 volts for a 3 or 5 output; is +21.333 volts for +2 or 6 output; is +16 volts for a 1 or 7 output; is 5.333 volts for an 8 or 18 output; and AN is −5.333 volts for a 9 or 17 output from ring counter 10a.

Assume an inductive load wherein the current lags the voltage by more than 20°. It will be noted that with an 18 output from counter 10a, current flows into phase A at +8 volts. In FIGURE 4 the current path is through rectifier 35c and transistor 35a. With a 1 output from counter 10a current flows into phase A at +24 volts and passes through transistor 34. Transistor 34 conducts by virtue of inverted transistor action. The collector of transistor 34 acts as an emitter; and the emitter thereof acts as a collector. Since driver transistor 34a is conductive, a large base current for transistor 34 is provided so that the voltage drop across the transistor is low, irrespective of the direction of current flow between its two p-type terminals. Similarly, for a 9 output from counter 10a current flows out of phase A at −8 volts. In FIGURE 4 the current path is through transistor 37b and rectifier 37d. With a 10 output from counter 10a current flows out of phase A at −24 volts through transistor 38. Transistor 38 conducts by virtue of inverted transistor action with the collector acting as an emitter and the emitter acting as a collector. Since driver transistor 38a is conductive, a large base current is provided for transistor 38 so that the voltage drop between its two n-type terminals is small irrespective of the direction of current flow. With a 17 output from counter 10a, current flows into phase A at −8 volts. In FIGURE 4 the current path is through rectifier 37c and transistor 37a. With an 8 output from counter 10a, current flows out of phase A at +8 volts. In FIGURE 4 the current path is through transistor 35b and rectifier 35d. Rectifier 35c is provided to prevent transistor 35a from short-circuiting the output at terminal A when it is more negative than +8 volts. Such short-circuiting would occur by virtue of inverted transistor action with base current being supplied through resistor 65a. Rectifier 35d is provided to prevent transistor 35b from short-circuiting the output at terminal A when it is more positive than +8 volts by virtue of inverted transistor action with base current being supplied through resistor 55a. Rectifier 37c is provided to prevent transistor 37a from short-circuiting the output at terminal A when it is more negative than −8 volts by virtue of inverted transistor action with base current being supplied through resistor 67a. Rectifier 37d is provided to prevent transistor 37b from short-circuiting the output at terminal A when it is more positive than −8 volts by virtue of inverted transistor action with base current being supplied through resistor 57a. If the power factor of the load is sufficiently high that the phase shift in current flow is less than 20°, then no inverted transistor action occurs in output transistors 34 and 38. If the load is purely resistive and substantially balanced then the following components may be eliminated: rectifier 35c, output transistor 35a and its associated driver circuit comprising transistor 35e and resistors 65a, 65b, and 65c; and rectifier 37d, output transistors 37b and its associated driver circuit comprising transistor 37f, Zener diode 77a, and resistors 57a, 57b, and 57c.

Referring now to FIGURE 5, for a 400 cycle output, generator 9b provides pulses with a frequency of 9.6 kc. which are coupled to a twenty-four stage ring counter 10b. The 1 through 9 outputs of counter 10b are coupled to an OR circuit 4b, the output of which is impressed upon a +24 input of five-state switch 1b. The 10 and 24 outputs of counter 10b are coupled to an OR circuit 5b, the output of which is impressed upon a +12 input of switch 1b. The 11 and 23 outputs of counter 10b are coupled to an OR circuit 6b, the output of which is impressed upon a 0 input of switch 1b. The 12 and 22 outputs of counter 10b are coupled to an OR circuit 7b, the output of which is impressed upon a −12 input of switch 1b. The 13 through 21 outputs of counter 10b are coupled to an OR circuit 8b, the output of which is impressed upon a −24 input of switch 1b.

The outputs of ring counter 10b actuate phase displaced five-state switches 2b and 3b (not shown) in a manner similar to that shown in FIGURE 1. In FIGURE 5 the phase displacement would be eight counts.

Referring now to FIGURE 6, four 12 volt batteries supply common power for each of the five-state switches. The negative terminal of battery 44b is connected to the positive terminal of battery 45. The negative terminal of battery 45 and the positive terminal of battery 47 are grounded. The negative terminal of battery 47 is connected to the positive terminal of battery 48b.

As indicated in FIGURE 6 and as shown in FIGURE 5, battery 44b drives ring counter 10b. For ring counter 10b all but one of its outputs is at a potential of +12 volts and that one of the outputs is at a potential of +24 volts. The +12 input of switch 1b is connected backwardly through a 12 volt Zener diode 75a to the base of driver transistor 35f. The 0 input of switch 1b is connected to the cathode of a 12 volt Zener diode 76. The anode of Zener diode 76 is again directly coupled to the base of driver transistor 36e and is coupled backwardly through a 12 volt Zener diode 76a to the base of driver transistor 36f. The −12 input of switch 1b is coupled backwardly through a 24 volt Zener diode 77b to the base of driver transistor 37e. The −24 input of switch 1b is coupled backwardly through a 36 volt Zener diode 78b to the base of driver transistor 38a. The driver circuit comprising transistor 34a shunts battery 44b; the driver circuits comprising transistors 35f and 36e shunt battery 45; the driver circuits comprising transistors 36f and 37e shunt battery 47; and the driver circuit comprising transistor 38a shunts battery 48b. The emitter of output transistor 35b is connected to the positive terminal of battery 45. Rectifier 35c, output transistor 35a, and its associated driver circuit comprising transistor 35e of FIGURE 4 are eliminated. The emitter of transistor 37a is connected to the negative terminal of battery 47. Rectifier 37d, output transistor 37b, and its associated driver circuit comprising transistor 37f of FIGURE 4 are also eliminated.

In operation of the circuit of FIGURE 6, with a +12 input, driver transistor 35f is rendered conductive which in turn renders output transistor 35b conductive, causing the +12 volt potential of the positive terminal of battery 45 to be impressed upon output terminal A. With a −12 input to switch 1b, driver transistor 37e is rendered conductive which in turn renders output transistor 37a conductive, causing the −12 volt potential of the negative terminal of battery 47 to be impressed upon output terminal A.

In operation of the circuit of FIGURE 5 and referring now to FIGURE 9, the line-to-line voltage AB is +48 volts for a 1, 2, 3, 4, or 5 output from counter 10b; is +36 volts for a 6 or 24 output; is 24 volts for a 7 or 23 output; is 12 volts for an 8 or 22 output; and AB is 0 volts for a 9 or 21 output from ring counter 10b. The line-to-load neutral voltage AN is +32 volts for a 5 output from ring counter 10b; is +28 volts for a 4 or 6 output; is +24 for a 3 or 7 output; is +20 volts for a 2 or 8 output; is +16 volts for a 1 or 9 output; is +8 volts for a 10 or 24 output; and AB is 0 volts for an 11 or 23 output from ring counter 10b.

The circuit of FIGURE 6 operates properly so long as the power factor of the load is sufficiently high that the phase shift in current flow does not exceed 7.5°. Thus current may flow into or out of phase A at zero volts since the provision of transistors 36a and 36b enables the conduction of current in both directions. However, current can flow only out of phase A at +12 volts through transistor 35b and rectifier 35d; and current can flow only into phase A at −12 volts through rectifier 37c and transistor 37b. Again, rectifier 35d prevents the occurrence of inverted transistor action for output voltages greater than +12 volts; rectifier 36d prevents inverted transistor action for outputs more positive than zero volts; rectifier 36c prevents inverted transistor action for output voltages more negative than zero volts; and the rectifier 37c prevents the occurrence of inverted transistor action for output voltages less than −12 volts.

So long as the phase shift in load current flow is less than 22.5° no inverted transistor action will occur in output transistors 34 and 38. It will be appreciated that if the power factor of the load is sufficiently low that the phase shift in current flow exceeds 7.5° then the circuit of FIGURE 6 may be provided with the additional components shown in FIGURE 4 comprising rectifier 35c, output transistor 35a and its associated driver circuit comprising transistor 35e as well as rectifier 37d, output transistor 37b and its associated driver circuit comprising transistor 37f. The provision of the additional components will permit bilateral current flow for the +12 volt and −12 volt outputs of switch 1b.

Referring now to FIGURE 10, I have shown the various phase voltages A, B and C and line-to-line voltage AB; and the line-to-load neutral voltage AN for an inverter employing three switches each providing an infinite number of states. Each of the phase voltages rises linearly from −24 volts to +24 volts over an interval of 60°; remains constant at +24 volts for an interval of 120°; decreases linearly from +24 volts to −24 volts over an interval of 60°; and remains constant at −24 volts for an interval of 120°. The output waveforms of each of the phase voltages is thus trapezoidal. Each of the line-to-line voltages is constant at +48 volts for an interval of 60°; decreases linearly from +48 volts to −48 volts over an interval of 120°; remains constant at −48 volts for an interval of 60°; and rises linearly from −48 volts to +48 volts over an interval of 120°. Each of the line-to-line voltages is thus of trapezoidal waveform. Each of the line-to-load neutral voltages decreases linearly from +32 volts to +16 volts with a shallow slope over an interval of 60°; decreases linearly from +16 volts to −16 volts with a steep slope over an interval of 60°; decreases linearly from −16 volts to −32 volts with a shallow slope over an interval of 60°; increases linearly from −32 volts to −16 volts with a shallow slope over an interval of 60°; increases linearly from −16 volts to +16 volts with a steep slope over an interval of 60°; and increases linearly from 16 volts to +32 volts with a shallow slope over an interval of 60°. In FIGURE 10, the voltages AB and AN have different waveforms, yet both have the same harmonic content.

It will be noted that the corresponding stepwise-varying waveforms of FIGURES 7, 8, and 9 constitute successively better approximations to the waveforms of FIGURE 10.

The following table shows the relationship between the number of switching states, the fundamental voltage component ($V_f$), the harmonic voltage component ($V_h$), the efficiency of fundamental power output ($P_f$), and the harmonic power loss ($P_h$) based on a total RMS output voltage ($V_t$) of unity and a total RMS power output ($P_t$) of one hundred for both the line-to-line and the line-to-load-neutral outputs of a three-phase inverter supplying a balanced load of unity power.

| Switch States | $V_t = 1$ | | $P_t = 100$ | |
| --- | --- | --- | --- | --- |
| | $V_f$ | $V_h$ | $P_f$ | $P_h$ |
| 2 | .9549 | .297 | 91.19 | 8.81 |
| 3 | .9861 | .166 | 97.24 | 2.76 |
| 4 | .9930 | .118 | 98.62 | 1.38 |
| 5 | .9956 | .094 | 99.12 | 0.88 |
| ∞ | .9990 | .046 | 99.79 | 0.21 |

It will be noted that for two-state switches of the prior art the power efficiency is only 91.19%; and the power loss is correspondingly 8.81%. For my invention, the power loss of the three-state switch is 2.76%, that of the four-state switch is 1.38%, and that of the five-state switch is 0.88%. The provision of a switch having an infinite number of states, producing the voltage outputs in FIGURE 10, results in a power loss of 0.21%. It will be appreciated that the collector power loss of the output transistors may range from 0.4% to 2%; the power loss in the driver circuits may range from 0.1% to 1%; and the total dissipative loss in the switches may range from 0.5% to 3%.

Assume in FIGURE 6 that transistors 34 and 38 have a saturation collector-to-emitter drop of .24 volt, a common-emitter base-to-collector current gain of 125, a maximum collector-to-emitter drop exceeding 48 volts, and a maximum power dissipation exceeding 0.5 watt. Since these two transistors conduct for the major portion of a cycle, the power losses in the remaining output transistors and in the rectifiers will be relatively small. It will be noted that each of resistors 54a, 54b, 68a and 68b may have a resistance value of 0.3 kilohm and that resistors 54c and 68c may each have a resistance value of 10K. It will be appreciated that the emitter-to-base resistances of the transistors 34 and 38 are only a few ohms; and negligible current flows through resistors 54a and 68a for normal transistor action. When driver transistors 34a and 38a are conductive, the drop across resistors 54b and 68b is substantially 12 volts; and the current therethrough is substantially 40 milliamperes. The base current of the output transistors is also substantially 40 ma. With a current gain of 125, the output transistors are capable of passing collector currents of 5 amperes. The load resistance should be sufficiently high that the output current is only 4.15 amperes. Thus the output transistors are always saturated. The power supplied to the load is 98.5 watts; and the collector dissipation in the output transistors is 1 watt. The power loss in the driver circuits is only 0.5 watt, since these circuits have only 12 volt supplies instead of 24 volt supplies. The total power drawn from the supplies is 100 watts. The harmonic loss in the power supplied to the load is 0.9 watt; and the fundamental power supplied to the load is 97.6 watts. The over-all power efficiency of the inverter is thus 97.6%.

It will be seen that I have accomplished the objects of my invention. My inverter has a high efficiency, and employs no transformers or filter inductors or capacitors. My inverter is direct-coupled and provides an alternating current output of low harmonic content. By providing switches having three states a significant reduction in harmonic power loss results. The harmonic power loss is further reduced as the number of switching states is increased.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An inverter including in combination a reference terminal, means for providing a direct-current voltage which is positive relative to the terminal, means for providing a direct-current voltage which is negative relative to the terminal, a first and a second and a third switching device each actuatable from a normally non-conductive to a conductive condition, the second device comprising a parallel circuit including a pair of transistors connected in series with a pair of oppositely polarized rectifiers, an output conductor, means including the first device for applying the positive voltage to the conductor, means including the second device for connecting the terminal to the conductor, means including the third device for applying the negative voltage to the conductor, and means for selectively rendering the devices conductive in the following repetitive cycle:

one-two-three-two- . . .

2. An inverter as in claim 1 in which the selective means renders each of the first and third devices conductive for an interval of 150 degrees and renders the second device in each instance conductive for an interval of 30 degrees.

3. An inverter as in claim 1 in which the positive and negative voltages are of equal magnitudes.

4. An inverter including in combination a source of direct-current voltage having a positive and a negative terminal, means providing a direct-current voltage which is positive relative to the positive terminal, means providing a direct-current voltage which is negative relative to the negative terminal, a first and a second and a third and a fourth switching device each actuatable from a normally non-conductive to a conductive condition, the second and third devices each comprising a parallel circuit including a pair of transistors connected in series with a pair of oppositely polarized rectifiers, an output conductor, means including the first device for applying the positive voltage to the conductor, means including the second device for connecting the positive terminal to the conductor, means including the third device for connecting the negative terminal to the conductor, means including the fourth device for applying the negative voltage to the conductor, and means for selectively rendering the devices conductive in the following repetitive cycle:

one-two-three-four-three-two- . . .

5. An inverter as in claim 4 in which the selective means renders each of the first and fourth devices conductive for an interval of 140 degrees and renders the second and third devices in each instance conductive for an interval of 20 degrees.

6. An inverter as in claim 4 in which the difference between the positive voltage and the voltage at the positive terminal and the difference between the negative voltage and the voltage at the negative terminal are both equal to the source voltage.

7. An inverter including in combination a reference terminal, means for providing a first and a second direct-current voltage each of which is positive relative to the terminal and the first voltage being greater than the second voltage, means for providing a third and a fourth direct-current voltage each of which is negative relative to the terminal and the fourth voltage being of greater magnitude than the third voltage, a first and a second and a third and a fourth and a fifth switching device each actuatable from a normally non-conductive to a conductive condition, the third device comprising a parallel circuit including a pair of transistors connected in series with a pair of oppositely polarized rectifiers, an output conductor, means including the first device for applying the first voltage to the conductor, means including the second device for applying the second voltage to the conductor, means including the third device for connecting the terminal to the conductor, means including the fourth device for applying the third voltage to the conductor, means including the fifth device for applying the fourth voltage to the conductor, and means for selectively rendering the devices conductive in the following repetitive cycle:

one-two-three-four-five-four-three-two- . . .

8. An inverter as in claim 7 in which the selective means renders each of the first and fifth devices conductive for an interval of 135 degrees and renders each of the second and third and fourth devices in each instance conductive for an interval of 15 degrees.

9. An inverter as in claim 7 in which the magnitudes of the first and fourth voltages are equal, in which the magnitudes of the second and third voltages are equal, and in which the first voltage is twice the second voltage.

10. An inverter as in claim 7 in which each of the second and fourth devices comprises a parallel circuit including a pair of transistors connected in series with a pair of oppositely polarized rectifiers.

11. An inverter providing a cyclic trapezoidal output waveform including in combination a plurality of terminals respectively supplying a maximum voltage and a minimum voltage and a number $m$ of intermediate voltages, a corresponding plurality of switching devices each actuable from a non-conductive to a conductive condition, an output conductor, means including the switching devices for connecting corresponding terminals to the output conductor, means selectively actuating the maximum voltage device for an interval of $120+60/(m+1)$ degrees, means selectively actuating the minimum voltage device for an interval of $120+60/(m+1)$ degrees, and means selectively actuating each intermediate voltage device during two spaced intervals of $60/(m+1)$ degrees each.

12. An inverter as in claim 11 in which the means for selectively rendering the devices conductive comprises a cyclic counter providing a number of outputs equal to $(6N-6)$ where N is the number of terminals, means for indexing the counter at a constant rate, a number of OR circuits corresponding to the number of devices, means coupling an odd number of at least five successive counter outputs to a first OR circuit, means coupling an equal number of successive counter outputs to a second OR circuit, means coupling only two non-successive counter outputs to a third OR circuit, each counter output being coupled to one and only one of said OR circuits, and means responsive to the OR circuits for actuating corresponding devices.

References Cited
UNITED STATES PATENTS

| | | | |
|---|---|---|---|
| 3,040,239 | 6/1962 | Walker | 323—24 |
| 3,052,833 | 9/1962 | Coolidge et al. | 321—5 |
| 3,100,851 | 8/1963 | Ross et al. | 307—107 |
| 3,153,187 | 11/1964 | Klees | 323—22 |
| 3,227,889 | 1/1966 | Paynter | 321—45 |

OTHER REFERENCES

Transistors Theory and Practice, "Triggers and Switches," p. 91, 1958.

JOHN F. COUCH, *Primary Examinner.*

WARREN E. RAY, *Examiner.*

W. H. BEHA, JR., *Assistant Examiner.*